R. P. GREENLEAF.
LOADING APPARATUS.
APPLICATION FILED FEB. 2, 1912.

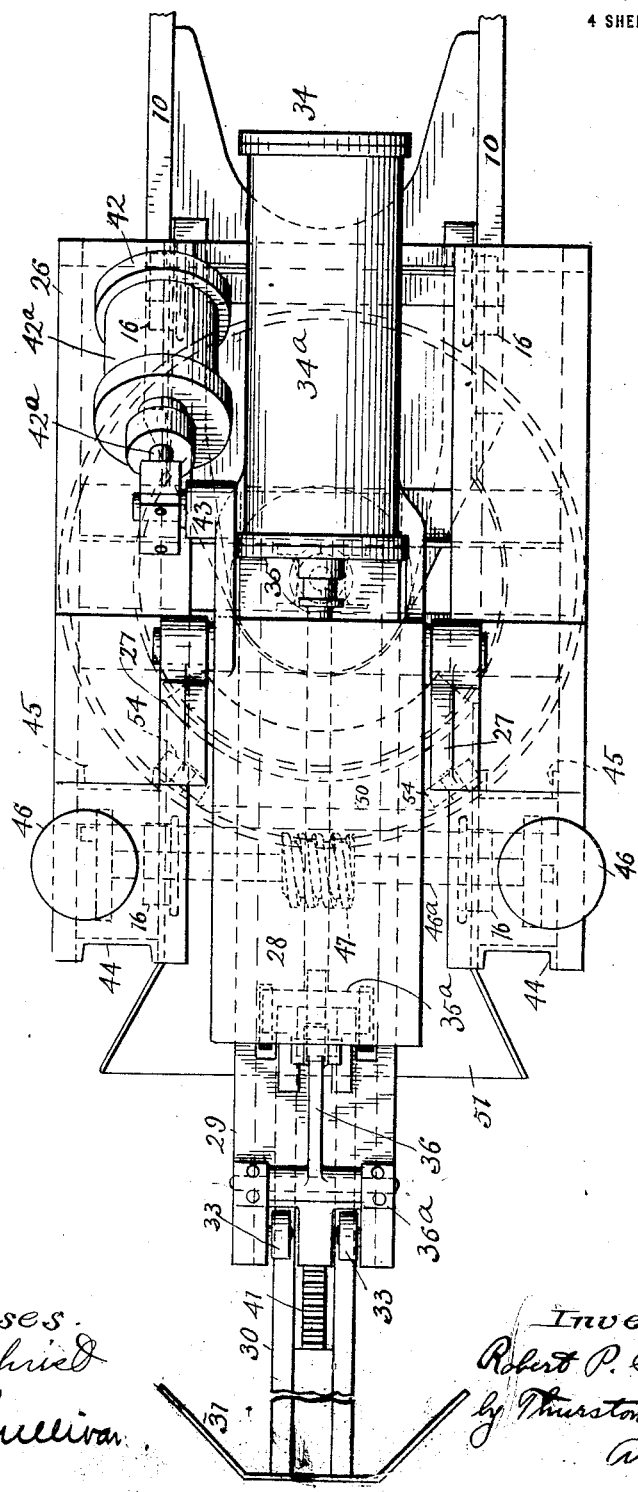

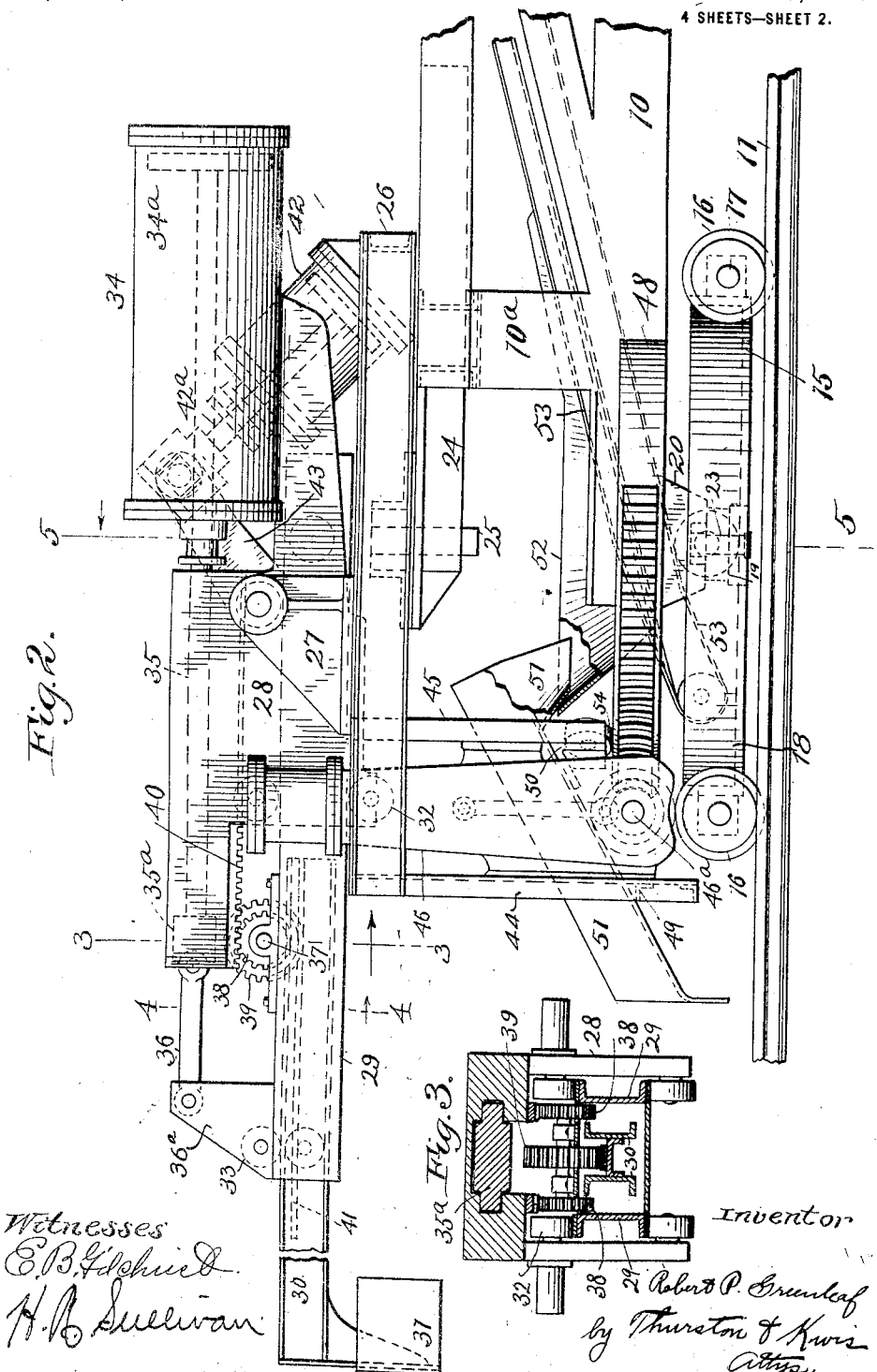

1,162,768.

Patented Dec. 7, 1915
4 SHEETS—SHEET 3.

Witnesses
E. B. Filchried
H. B. Sullivan

Inventor
Robert P. Greenleaf
by Thurston & Kwis
attys

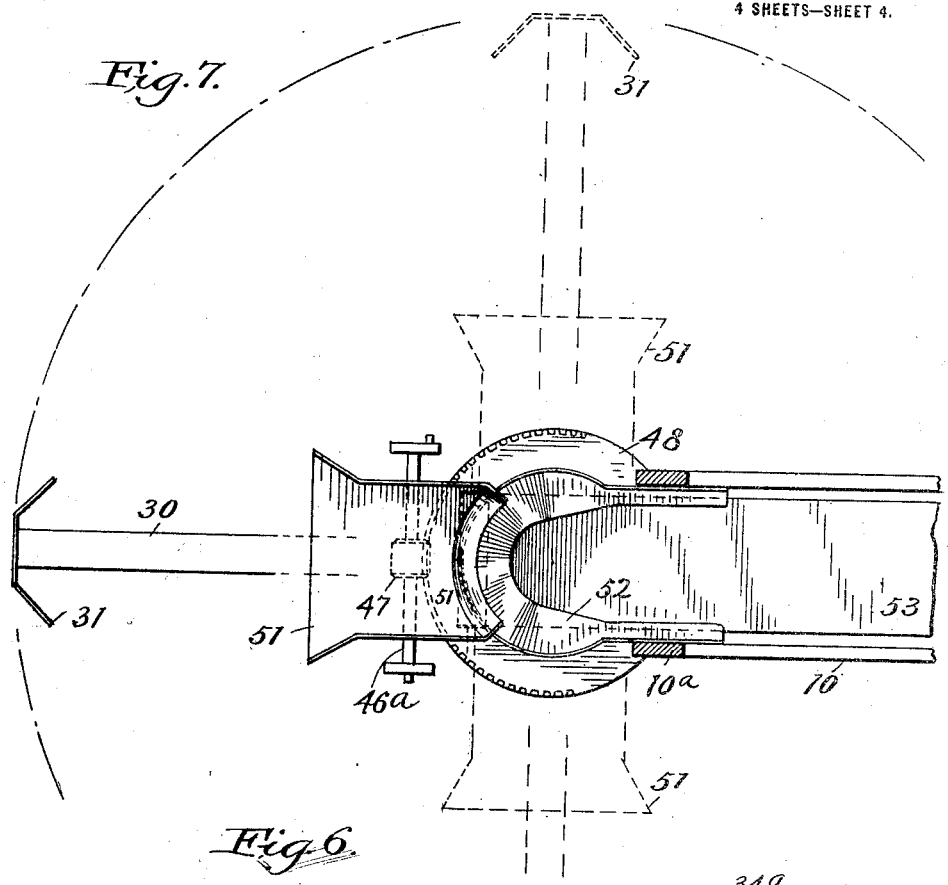
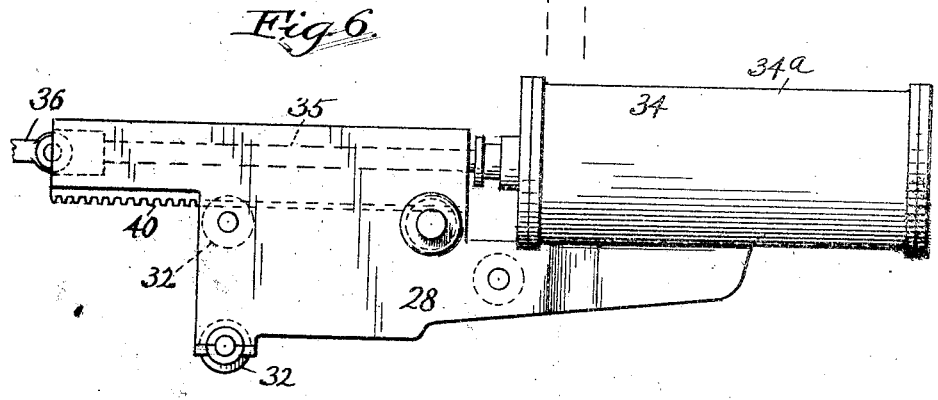

UNITED STATES PATENT OFFICE.

ROBERT P. GREENLEAF, OF CLEVELAND, OHIO, ASSIGNOR TO FRANK BILLINGS, OF CLEVELAND, OHIO.

LOADING APPARATUS.

1,162,768.   Specification of Letters Patent.   Patented Dec. 7, 1915.

Application filed February 2, 1912. Serial No. 674,896.

*To all whom it may concern:*

Be it known that I, ROBERT P. GREENLEAF, a citizen of the United States, residing at Cleveland, in the county of Cuyahoga and State of Ohio, have invented a certain new and useful Improvement in Loading Apparatus, of which the following is a full, clear, and exact description.

This invention relates to improvements in loading apparatus adapted particularly for use in mines, and especially to that type of loading apparatus which includes a conveyer and a material digging and collecting hoe which may be swung horizontally, tilted vertically and reciprocated so that loosened material within the range of movement of the hoe may be scraped up onto the conveyer and by the latter conveyed rearwardly to an auxiliary conveyer or to cars provided to carry away the material.

A loading apparatus of the type referred to constitutes the subject matter of the patent granted to Frank Billings, #1,095,786, dated May 5th, 1914, for mining and loading apparatus, and the present invention is in some respects an improvement over the construction disclosed in said patent.

One of the objects of the present invention is to provide an improved loading apparatus of this general type which is better adapted to collect and move on to the conveyer material located on either side of the machine.

Further, the invention aims to provide a loading machine which is well adapted for use in various kinds of mines, such as coal mines, as well as iron mines, and aims to provide a construction such that the hoe has a wide range of angular movement, and may be operated at any angle within an arc of at least 180° to move material directly onto the conveyer without the necessity of swinging the hoe laterally substantially into line with the axis of the machine, before or at the time that it is being drawn inwardly or rearwardly, as has been required heretofore.

Further, the invention aims to so construct and support the parts which are turned relative to the main frame, that sufficient clearance is provided above the inclined apron which discharges onto the conveyer, to permit the delivery onto the conveyer of large pieces, as well as material more finely divided.

My invention may be briefly summarized as consisting in certain novel details of construction and combinations and arrangements of parts which will be described in the specification and set forth in the appended claims.

Figure 4:
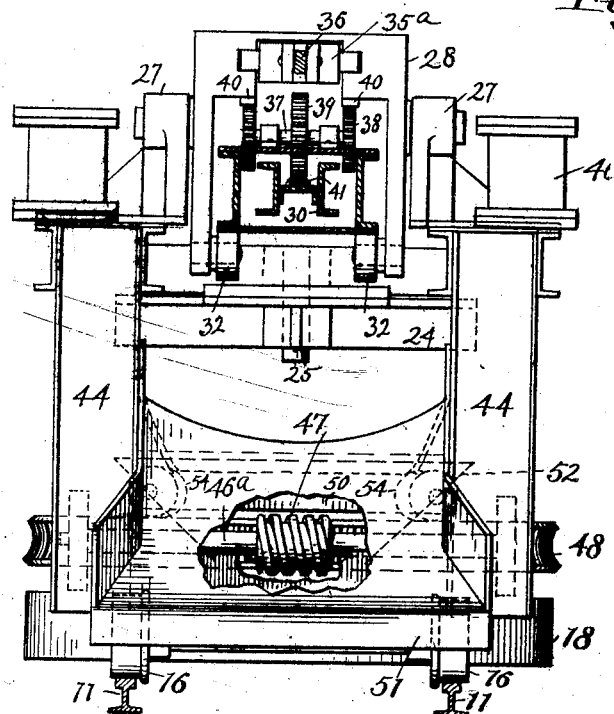
Figure 5:
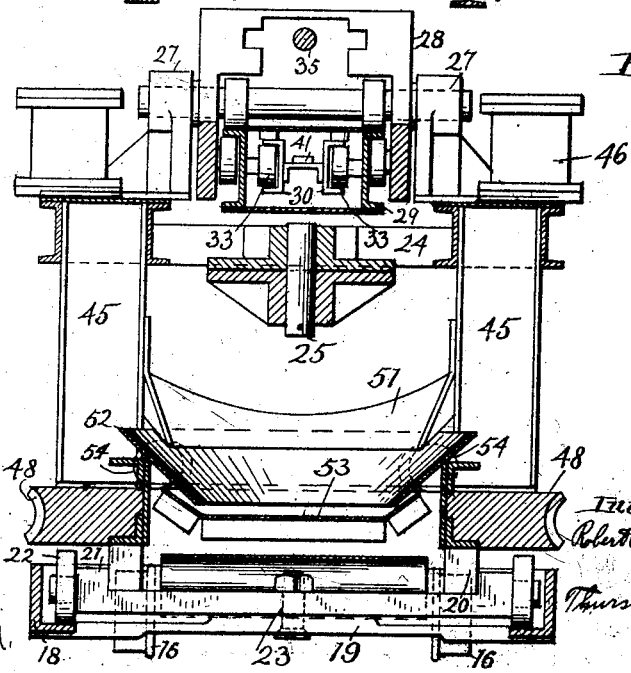

In the drawings, I have illustrated the preferred embodiment of the main parts of my invention, and in the drawings Figure 1 is a top plan view of the forward portion of the apparatus, the rear part of the frame and the rear part of the conveyer being omitted; Fig. 2 is a side elevation of the same; Fig. 3 is a cross sectional view, substantially along the line 3—3 of Fig. 2 looking in the direction indicated by the arrow; Fig. 4 is a front view of the same, parts being broken away and parts in section on line 4—4 of Fig. 2; Fig. 5 is a transverse sectional view substantially along the line 5—5 of Fig. 2, looking in the direction indicated by the arrow; Fig. 6 is a side elevation of the cradle detached; and Fig. 7 is a diagrammatic plan view showing particularly the hopper and apron.

The machine includes a main frame 10, which is preferably formed largely of structural members and is supported upon trucks having wheels which run upon a mine track 11. I have not here shown the rear truck, as the latter may be of any suitable construction. The forward truck which is here illustrated, is designed especially for permitting the machine to be turned or diverted onto a branch track so that it may be operated at an angle of 90° or less with respect to the line of the main track 11. This forward truck includes forward and rear wheels 16 which are mounted upon axles 17 secured to a truck frame which in this case is a circular track 18, L-shaped in cross section, as well illustrated in Fig. 5, and having a horizontal inner circular flange as shown. Extending centrally across this track or truck frame is a cross member 19. The weight of the entire forward portion of the machine is transmitted to this circular track through the medium of a pair of blocks 20 which are secured to the underside of the side portions of the frame 10, an axle 21 rigidly secured to these blocks, and wheels 22 mounted upon the ends of the axle and bearing upon the horizontal flange of the track or circular truck frame 18. This axle is connected at its center to the center of the cross member 19 of the truck frame by a king bolt 23, which transmits none of the weight of the machine, but merely side thrust and forms the pivotal connection between the machine frame 10 and the truck frame. With this construction, the truck may be turned through an entire revolution if desired, and the forward truck may be diverted to a track at any angle to the main track 11 carrying the rear truck, and at the same time, the forward part of the machine itself will be well supported by the front truck.

The frame 10 is provided somewhat to the rear of the center of the truck 12 with a pair of upright side members 10ª which may be connected together by cross members from which projects forwardly an arm 24 constituting in effect a cantaliver which supports in part the movable digging and collecting apparatus. This arm 24 is provided at its forward end with a suitable casting to which is pivotally connected by a king bolt 25, directly above or in line with the truck king bolt 23, a frame or turn table 26. This frame 26 includes a pair of side frame members which may be connected together near the center and at the rear by suitable cross members, but forwardly of the king bolt 25 are unconnected so as to leave a pair of forwardly projecting arms between which the hoe shank or ram and other parts may be tilted. The side members of the horizontally swinging frame or turn table 26 are provided with a pair of standards 27 to which is trunnioned a cradle 28, a detached side view of which is shown in Fig. 6. This cradle through the medium of its trunnions and the standards, is mounted for tilting movement in a vertical plane so as to enable the hoe and hoe shank to be elevated or lowered.

The cradle supports a reciprocating hoe shank or ram composed of two telescopic parts including an outer part 29 and an inner part 30, the latter carrying at its free end a hoe 31 which preferably includes a plate or casting so shaped that when the hoe is retracted, it will effectively scrape material rearwardly. The outer member 29 is supported on a number of rollers 32 carried by the cradle and the inner member is supported on rollers 33, part of which are illustrated by dotted lines in Fig. 2. This hoe is reciprocated by mechanism including a motor 34, in this case in the form of a reciprocating motor, the cylinder 34ª of which is mounted upon a rearward extension of the cradle. The cylinder contains a piston, to which is connected a piston rod 35 having at its forward end a cross head 35ª adapted to slide in grooves or ways in the upper part of the cradle, as well illustrated in Fig. 3. This cross head is connected by a link 36 to upwardly extending members 36ª carried by the forward end of the outer member 29 of the hoe shank. The outer member of the hoe shank through this connected mechanism moves with the piston of the motor. Through the movement of the outer member of the hoe shank, the inner member is also actuated and is caused to move at a greater rate than the outer member. The mechanism for shifting the inner member of the hoe shank relative to the outer member includes a short shaft 37 which is supported in suitable bearings on the top of the outer member, as illustrated in Figs. 2 and 3, and has secured to it a pair of pinions 38 of equal size, and a larger central pinion 39. The pinions 38 are arranged to engage respectively a pair of racks 40 secured to the under side of the upper part of the cradle, and the pinion 39 in a similar manner engages a rack 41 on the inner hoe shank member, as illustrated in Figs. 2 and 3. When the outer hoe shank member is shifted relative to the cradle, the pinions 38, the shaft 37, and the larger pinion 39 will be turned, and since the shaft carrying the aforesaid pinions 38 and 39 moves longitudinally with respect to the cradle at the same rate as the outer shank member, and since the upper peripheries of the pinions 38 mesh with the fixed racks, while the lower periphery of pinion 39 meshes with the rack on the inner shank member, the latter is moved relatively to the outer shank member, and the rates of movement of the outer and inner members are proportionate respectively to the distance of the axis of shaft 37 to the pitch line of rack 40, and the distance of the pitch line of rack 41 to the pitch line of rack 40. This construction gives the hoe a large range of movement and enables it to be operated through a large or small radius as desired, and when it is operated on a short radius, the rear end of the hoe shank will not project any considerable distance beyond the rear end of the frame 26.

The cradle and hoe are adapted to be tilted in a vertical plane about the axis of the cradle trunnions through the medium of a tilting motor 42, including an inclined cylinder 42ª supported in fixed position on the frame 26 at one side of the cylinder 34ª. This cylinder 42ª contains a piston, which is connected to a piston rod 42ᵇ, having a sliding pivotal connection with a wrist pin projecting from the end of a crank arm 43 extending upwardly and rearwardly from the cradle. The two reciprocating motors may be operated by air or other motive fluid.

At the forward end of the frame or turn table 26 and on opposite sides thereof are two pairs of downwardly projecting channel arms 44 and 45, the arms 45 being at the rear of the arms 44 and being somewhat shorter than the latter. At the forward part of the frame 26, between the arms 44 and 45 and on the opposite sides of the cradle 28, I have provided in fixed position relative to the frame 26, two upright reciprocating engines 46, the function of which is to turn the turn table and parts carried thereby horizontally about the king bolt 25, as an axis, so that the hoe may be able to reach and collect the material arranged in different parts of the working space of the mine. These engines turn a crank shaft 46ᵃ which is provided at its center with a worm 47 arranged to engage the teeth of a large horizontal worm wheel or segment 48 which is in fixed position relative to the worm 47 and is secured to and carried by the main frame 10. This worm wheel 48 is annular in shape, and its teeth extend through an arc of slightly greater than a half circle. This worm wheel also extends outwardly slightly beyond the sides of the main frame 10 and about the front of the frame, as illustrated in the various figures.

It will be seen that when the engines 46 are operated, the worm will travel about the periphery of the worm wheel 48 so as to turn the turn table and the parts carried thereby in a horizontal plane, and that these parts may thus be turned through an arc of substantially 90° to each side of the center line of the main frame or axis of the machine.

Supported by a cross member 49, (shown by dotted lines in Fig. 2), extending between the lower ends of the depending forward arms 44, and by a cross member 50 extending between the lower ends of the depending arms 45 is an inclined apron 51 which is arranged to discharge material into a peculiarly shaped hopper 52, which is supported by the frame 10 in position to guide the material on to a conveyer 53, in this case a belt conveyer, which is supported by and extends rearwardly through the frame and is provided to convey the material to a suitable receiving member at the rear of the machine adapted to convey the material rearwardly from the machine. This apron 51 is therefore carried by the rotating or turning part of the apparatus and hence is always in line with the hoe, regardless of the angle of the hole shank relative to the axis of the machine. By supporting the apron in this manner, the hoe can be turned at any angle within the limits of the machine, and the material can be scraped directly inward to the machine while the hoe is at that angle, and up onto the apron into the hopper 52 without the necessity of first swinging the hoe to a position substantially in line with the axis of the machine.

The apron is provided with upright side members, which are convergent from their outer ends as shown in Fig. 1 so as to somewhat contract the stream of material moving rearwardly along the same. At its rear end, the apron is provided with a depending portion which extends into the hopper 52 and is rounded so as to conform to the shape of the latter. The forward portion of the hopper is frusto-conical, the frusto-conical portion extending throughout an arc of at least 180°. The rear portions of the hopper may be straight as regards the axis of the machine and extend upwardly for a suitable distance along the inclined side portions, as well illustrated in Fig. 2. The axis of the curvature of the frusto-conical part of the hopper coincides with the axis of movement of the turn table and apron so that the depending discharge end of the apron may swing within and about the conical surface and regardless of its position relative to the hopper will discharge the material into the same and onto the conveyer.

I prefer that the weight of the turning and reciprocating part of the apparatus be distributed and be carried in a large part independently of the member to which it is directly pivoted. I can thereby employ the cantaliver pivotal support illustrated in Fig. 2, and do away with the necessity of employing a pivoting support which projects sufficiently forward to interfere with or materially restrict the space between this part and the apron. I therefore carry a large part of the weight of the turning and reciprocable part of the apparatus on the lower part of the frame or on the member supported by the latter below the apron. In this case, I utilize as a support, the worm wheel 48, and I provide on the cross member 50 which extends between the arms 45 which depend from the forward part of the frame or turn table 26, two or more rollers 54, which bear upon the upper surface of this worm wheel 48.

I am not required to use the worm wheel 48 as a support, but in this case it is convenient for this purpose. Any suitable member which will constitute a track for the rollers, and which is supported by the frame 10 beneath the apron, will suffice. When the turn table and the parts carried thereby are turned about the king bolt 25, as an axis, the rollers 54 roll or turn upon the member 48 as the supporting track. I therefore pivot the turn table on one member at the top of the frame, and support it, in part at least, independently of this member and thus eliminate the necessity for a large circular support directly beneath the turn table.

Having thus described my invention, what I claim is:

1. In a loading apparatus, a frame provided with a conveyer for conveying material rearwardly along the same, said conveyer having a fixed path of movement relative to the frame, a reciprocating member for scraping material toward the conveyer, a support for said member carried by the frame and mounted for turning movement about a vertical axis, and an inclined member along which the material is moved by the scraping member to the conveyer, said inclined member being movable with said turning support relative to the frame and conveyer.

2. In a loading apparatus, a frame provided with a conveyer for conveying material rearwardly along the same, said conveyer having a fixed path of movement relative to the frame, a reciprocating member for scraping material toward the conveyer, a support for said member carried by the frame and mounted for turning movement about a vertical axis, and an inclined apron at the front of the frame for discharging onto the conveyer the material scraped rearwardly by the scraping member, said apron being carried by said turning support and being turned therewith relative to the frame and conveyer.

3. In a loading apparatus, a frame, a conveyer carried thereby for moving material rearwardly along the same, a reciprocating hoe for moving the material toward the conveyer, a support for the hoe mounted on the upper part of the frame for turning movement about a vertical axis, an inclined apron along which the material is adapted to be moved by the hoe onto the conveyer, and apron supporting means depending from the forward part of the turning support and rigid therewith, whereby the apron is turned with the hoe and its support.

4. In a loading apparatus, a frame provided with a conveyer for conveying material rearwardly along the same, said conveyer having a fixed path of movement relative to the frame, a reciprocating member for scraping material toward the conveyer, a support for said member carried by the frame and mounted for turning movement about a vertical axis, an apron along which the material is moved by the scraping member to the conveyer, said apron being movable with said turning support relative to the frame and conveyer, and a hopper over the forward portion of the conveyer and beneath the discharge end of the apron.

5. In a loading apparatus, a frame provided with a conveyer for conveying material rearwardly along the same, said conveyer having a fixed path of movement relative to the frame, a reciprocating member for scraping material toward the conveyer, a support for said member carried by the frame and mounted for turning movement above a vertical axis, an apron along which the material is moved by the scraping member to the conveyer, said apron being movable with said turning support relative to the frame and conveyer, a hopper over the forward portion of the conveyer and beneath the discharge end of the apron, said hopper having its forward portion rounded to accommodate the turning movement of the apron.

6. In a loading apparatus, a frame provided with a conveyer for conveying material rearwardly along the same, a reciprocating member for scraping material toward the conveyer, a support for said member carried by the frame and mounted for turning movement about a vertical axis, an apron along which the material is moved by the scraping member to the conveyer, said apron being movable with said turning support, and a hopper over the forward portion of the conveyer and beneath the discharge end of the apron, the forward portion of the hopper being substantially frusto-conical with a center of curvature coincident with the axis of movement of the apron.

7. In a loading apparatus, a main frame, a conveyer extending lengthwise thereof, a reciprocating hoe for moving the material toward the conveyer, a turning member supporting the hoe, a support for said turning member located at the upper part of the frame above the forward end of the conveyer, said turning member having a swiveled connection with said support, and additional means for supporting said turning member comprising a lower support on the frame, and depending means on said turning member engaging said lower support.

8. In a loading apparatus, a main frame, a conveyer for conveying material rearwardly along the same, a reciprocating hoe for moving material toward the conveyer, a turning member supporting the hoe, an arm on the upper part of the frame above the forward end of the conveyer and having near its forward end a pivotal connection with said turning member near the center of the latter, and additional means for supporting the turning member comprising a support below said arm and depending means on the turning member provided with rollers which engage the support.

9. In combination in a loading apparatus, a main frame, a conveyer supported thereby for conveying material rearwardly through a path fixed relative to the frame, a reciprocating hoe, a hoe supporting member mounted for turning movement about a vertical axis, a support at the upper part of the frame for said hoe supporting member, an inclined apron at the forward end of the conveyer, and means depending from the forward end of said hoe supporting member and rigidly supporting said apron.

10. In a loading apparatus, a main frame, a conveyer extending lengthwise through the same, an inclined apron at the forward end of the machine, a reciprocating hoe for moving material rearwardly up the inclined apron, a turning hoe supporting member, a support at the top of the frame to which said hoe supporting member has a swivel connection, a lower support for said turning member, depending means at the forward part of said hoe supporting member and engaging said lower support, the said inclined apron being carried by the said depending means.

11. In a loading apparatus, a main frame, a conveyer extending lengthwise therethrough, a hopper at the forward end of the frame and above the conveyer, an inclined apron adapted to discharge into the hopper, a cantilever arm at the upper part of the frame above the hopper, a reciprocating hoe for moving material rearwardly up along the apron, a hoe supporting member swiveled to the forward part of said arm, additional supporting means for said hoe supporting member comprising an annular support carried by the frame below the top of the hopper, and depending means at the forward end of said hoe supporting member, and engaging said lower support.

12. In a loading apparatus, a main frame, a conveyer extending lengthwise therethrough, a reciprocating hoe for moving material toward the conveyer, an upper forwardly projecting cantaliver arm at the upper part of the frame, a hoe supporting members swiveled to said arm for turning movement about a vertical axis, the said hoe supporting member having a pair of forwardly projecting arms, a cradle supported on said member for turning movement about a horizontal axis, and adapted to be swung downwardly between said forwardly projecting arms, additional supporting means for said hoe supporting member comprising a lower support carried by the frame, and means depending from the forward ends of said arms engaging said lower support.

In testimony whereof, I hereunto affix my signature in the presence of two witnesses.

ROBERT P. GREENLEAF.

Witnesses:
 A. F. KWIS,
 H. R. SULLIVAN.